(12) United States Patent
Oshita et al.

(10) Patent No.: US 6,709,636 B1
(45) Date of Patent: Mar. 23, 2004

(54) METHOD AND APPARATUS FOR GASIFYING FLUIDIZED BED

(75) Inventors: Takahiro Oshita, Tokyo (JP); Tetsuhisa Hirose, Tokyo (JP); Shuichi Nagato, Tokyo (JP); Norihisa Miyoshi, Tokyo (JP); Masamichi Nakashiba, Tokyo (JP)

(73) Assignee: Ebara Corporation, Tokyo (JP)

( * ) Notice: Subject to any disclaimer, the term of this patent is extended or adjusted under 35 U.S.C. 154(b) by 0 days.

(21) Appl. No.: 09/180,601

(22) PCT Filed: Jun. 23, 1997

(86) PCT No.: PCT/JP97/02152

§ 371 (c)(1),
(2), (4) Date: Nov. 10, 1998

(87) PCT Pub. No.: WO97/48950

PCT Pub. Date: Dec. 24, 1997

(30) Foreign Application Priority Data

Jun. 21, 1996 (JP) ............................................. 8-181479

(51) Int. Cl.[7] ........................... B01J 8/18; F27B 15/00; F27B 15/14

(52) U.S. Cl. ..................... 422/146; 422/139; 422/141; 422/143; 422/146

(58) Field of Search ................................ 422/139–147, 422/168

(56) References Cited

U.S. PATENT DOCUMENTS

| | | | |
|---|---|---|---|
| 5,156,099 A | * 10/1992 | Ohshita et al. | ............ 110/245 |
| 5,513,599 A | 5/1996 | Nagato et al. | |
| 5,620,488 A | * 4/1997 | Hirayama et al. | ........ 48/197 R |
| 5,922,090 A | 7/1999 | Fujimura et al. | |

FOREIGN PATENT DOCUMENTS

| | | |
|---|---|---|
| JP | 4-155114 | 5/1992 |
| JP | 5-23321 | 4/1993 |
| JP | 6-317306 | 11/1994 |
| JP | 7-56362 | 6/1995 |
| JP | 7-332614 | 12/1995 |

* cited by examiner

Primary Examiner—Jerry D. Johnson
Assistant Examiner—Alexa A. Doroshenk
(74) Attorney, Agent, or Firm—Wenderoth, Lind & Ponack L.L.P.

(57) ABSTRACT

Combustibles such as wastes are gasified in a fluidized bed. A fluidized-bed furnace has a heat recovery region in addition to a combustion region. The temperature of a fluidized bed or the temperature of a freeboard is controlled so as to be kept at a predetermined value by adjusting the heat recovery rate in the heat recovery region.

18 Claims, 9 Drawing Sheets

METHOD AND APPARATUS FOR GASIFYING FLUIDIZED BED

BACKGROUND OF THE INVENTION

1. Technical Field

The present invention relates to a method and apparatus for gasifying combustibles in a fluidized-bed furnace.

2. Related Art

It has been desired in recent years to incinerate wastes such as municipal wastes or plastic wastes that are produced in large quantities for reducing their volume and effectively utilizing their waste heat when the wastes are incinerated. Since incineration ash generated when the wastes are incinerated usually contain heavy metals, it is necessary to stabilize those heavy metals when the incineration ash is reclaimed in landfill sites.

It has theretofore been customary to treat a considerable amount of wastes such as municipal wastes, waste tires, sewage sludges, and industrial sludges with dedicated incinerators. Night soil and highly concentrated wastewater have also been treated with dedicated wastewater treatment facilities. However, large quantities of industrial wastes are still being discarded in an untreated state, thus causing environmental pollution.

As waste treatment technology suitable for environmental conservation to replace conventional incineration method, gasification and slagging combustion systems which combine gasification and high-temperature combustion have been developed, and some of them are about to be put to practical use. The inventors of the present application have proposed in Japanese patent application No. 8-331435 a method for treating wastes by gasification in which wastes are gasified at low temperature in a fluidized-bed gasification furnace, gaseous material and char produced in the fluidized-bed gasification furnace are introduced into a melting furnace and gasified at a high temperature, for thereby producing low calorific gas or medium calorific gas.

The fluidized-bed gasification furnace preferably comprises an internal circulating fluidized-bed furnace, and the melting furnace preferably comprises a swirling-type melt combustion furnace. It is most preferable to employ an internal circulating fluidized-bed furnace and a swirling-type melt combustion furnace in combination.

According to the proposed method, a fluidizing gas delivered into the fluidized-bed furnace comprises a central fluidizing gas supplied from a central furnace bottom into the furnace and a peripheral fluidizing gas supplied from a peripheral furnace bottom into the furnace. The mass flow of the central fluidizing gas is smaller than the mass flow of the peripheral fluidizing gas. An upward flow of the fluidizing gas in an upper peripheral furnace area is deflected toward a central furnace area by an inclined wall so that a moving bed where a fluidized medium (generally, silica sand is used) descends and is dispersed in the central furnace area, and a fluidized bed where the fluidized medium is intensely fluidized in the peripheral furnace area are formed. Combustibles supplied to the fluidized-bed furnace are gasified into a combustible gas while the combustibles are being circulated together with the fluidized medium.

The fluidizing gas delivered into the fluidized-bed furnace contains an amount of air which is equal to or less than 30% of a theoretical amount of combustion air required to combust combustibles. Incombustibles are discharged from the peripheral furnace bottom and classified, and sand obtained by classification is returned to the fluidized-bed furnace. Combustible gas may be produced by incomplete combustion of combustibles in the melt combustion furnace, and the produced combustible gas may be used as a town area gas or material for chemical synthesis. On the other hand, when the combustible gas and fine particles generated in the fluidized-bed furnace are completely combusted in the melt combustion furnace, exhaust gas having high temperature may be obtained, and the obtained gas may be supplied to a gas turbine for generating electric power and may also be used to generate steam with a boiler for generating electric power by using a steam turbine. As a result, a combined-cycle power generation system is capable for recovering energy.

In case of producing low calorific gas or medium calorific gas by incomplete combustion in the melt combustion furnace, the reaction in the melt combustion furnace is highly sensitive to gas conditions, at the inlet of the melt combustion furnace, including gas composition, pressure and temperature, and is particularly governed by the gas temperature. However, since municipal wastes as the material for the produced gas have different heating values, it is very difficult to obtain a gas having a stable temperature in the fluidized-bed furnace.

The temperature in the fluidized-bed furnace is controlled by adjusting the amounts of the peripheral fluidizing gas and the central fluidizing gas. When the combustibles are of a high-calorific material such as plastics, then the temperature in the fluidized-bed furnace which cannot be well controlled tends to be excessively high, and hence gas conditions of the generated gas including gas composition, temperature and pressure may be fluctuated.

The present invention has been made in view of the above problems, and it is therefore an object of the present invention to provide a fluidized-bed gasification method and apparatus which can suppress fluctuations in the temperature of a fluidized bed or a freeboard in a fluidized-bed furnace.

SUMMARY OF THE INVENTION

In order to achieve the above object, according to the present invention, a heat recovery region is provided adjacent to a fluidized bed with a partition wall interposed therebetween in a fluidized-bed furnace having a moving bed and a fluidized bed, and a heat exchanger such as heat transfer tubes in which a heating medium flows and an air diffuser are disposed in the heat recovery region. The amount of a fluidizing gas which forms the moving bed and the fluidized bed and the amount of a fluidizing gas supplied from the air diffuser in the heat recovery region are adjusted to allow a fluidized medium to flow over the partition wall into the heat recovery region, and the heat recovery rate from the fluidized medium is controlled to prevent the temperature of the fluidized medium from rising excessively.

Since the amounts of a peripheral fluidizing gas (or a second fluidizing gas) and a central fluidizing gas (or a first fluidizing gas) are adjusted to control the temperature of a combustion region to some extent, this temperature control in the combustion region is combined with the temperature control in the heat recovery region. In this combination, the temperature control in the combustion region (the moving bed and the fluidized bed) may be main temperature control and the temperature control in the heat recovery region may be auxiliary temperature control, or vice versa.

According to the present invention, a heat recovery region and a combustion region are provided in the fluidized-bed furnace, and the temperature of a fluidized bed or the temperature of a freeboard is controlled so as to be kept at a predetermined value by controlling the heat recovery rate in the heat recovery region.

According to an aspect of the present invention, the fluidized-bed furnace includes the heat recovery region and the combustion region for gasifying the combustibles, separated by a partition wall, upper and lower portions of the heat recovery region and the combustion region being interconnected; the combustion region is further divided into first and second areas adjacent to each other; the fluidizing gas supplied to the fluidized-bed furnace comprises a first fluidizing gas supplied as an upward flow into the furnace from an area near the first area at the furnace bottom, a second fluidizing gas supplied as an upward flow into the furnace from an area near the second area at the furnace bottom, and a heat recovery region fluidizing gas supplied to the heat recovery region; the mass flow of the first fluidizing gas is smaller than the mass flow of the second fluidizing gas, so that a moving bed where the fluidized medium descends and is dispersed is formed in the first area and a fluidized bed where the fluidized medium is intensely fluidized is formed in the second area, and combustibles supplied to the furnace are gasified into a combustible gas in the combustion region while circulating together with the fluidized medium; the fluidized medium in the combustion region flows over the partition wall into the heat recovery region, and the fluidized medium in the heat recovery region is returned from a lower portion of the partition wall into the combustion region; and the temperature of the fluidized bed or the temperature of the freeboard is controlled by adjusting the heat recovery rate in the heat recovery region with the heat recovery region fluidizing gas.

Preferably, temperature control in the fluidized-bed furnace comprises temperature control in the combustion region with the first fluidizing gas and the second fluidizing gas and temperature control in the heat recovery region, and the temperature control in the combustion region is a main temperature control and the temperature control in the heat recovery region is an auxiliary temperature control.

Preferably, temperature control in the fluidized-bed furnace comprises temperature control in the combustion region with the first fluidizing gas and the second fluidizing gas and temperature control in the heat recovery region, and the temperature control in the combustion region is an auxiliary temperature control and the temperature control in the heat recovery region is a main temperature control.

According to another aspect of the present invention, the fluidized-bed furnace is of a substantially circular in horizontal cross-sectional shape, and includes the heat recovery region at an outer peripheral region and the combustion region for gasifying the combustibles at a central region, separated by a partition wall, upper and lower portions of the heat recovery region and the combustion region being interconnected; the combustion region is further divided into a central area and a peripheral area; the fluidizing gas supplied to the fluidized-bed furnace comprises a central fluidizing gas supplied as an upward flow into the furnace from the central area at the bottom of the furnace, a peripheral fluidizing gas supplied as an upward flow into the furnace from the peripheral area at the bottom of the furnace, and a heat recovery region fluidizing gas supplied to the heat recovery region; one of the mass flow of the central fluidizing gas and the mass flow of the peripheral fluidizing gas is smaller than the other, so that a moving bed where the fluidized medium descends and is dispersed is formed in one of the central and peripheral areas of the furnace and a fluidized bed where the fluidized medium is intensely fluidized is formed in the other of the central and peripheral areas of the furnace, and the combustibles supplied to the furnace are gasified into a combustible gas while circulating together with the fluidized medium; the fluidized medium in the combustion region flows over the partition wall into the heat recovery region, and the fluidized medium in the heat recovery region is returned from a lower portion of the partition wall into the combustion region; and the temperature of the fluidized bed or the temperature of the freeboard is controlled by adjusting the heat recovery rate in the heat recovery region with the heat recovery region fluidizing gas.

Preferably, temperature control in the fluidized-bed furnace comprises temperature control in the combustion region with the central fluidizing gas and the peripheral fluidizing gas and temperature control in the heat recovery region, and the temperature control in the combustion region is a main temperature control and the temperature control in the heat recovery region is an auxiliary temperature control.

Preferably, temperature control in the fluidized-bed furnace comprises temperature control in the combustion region with the central fluidizing gas and the peripheral fluidizing gas and temperature control in the heat recovery region, and the temperature control in the combustion region is an auxiliary temperature control and the temperature control in the heat recovery region is a main temperature control.

DETAILED DESCRIPTION OF THE INVENTION

Figure 1:
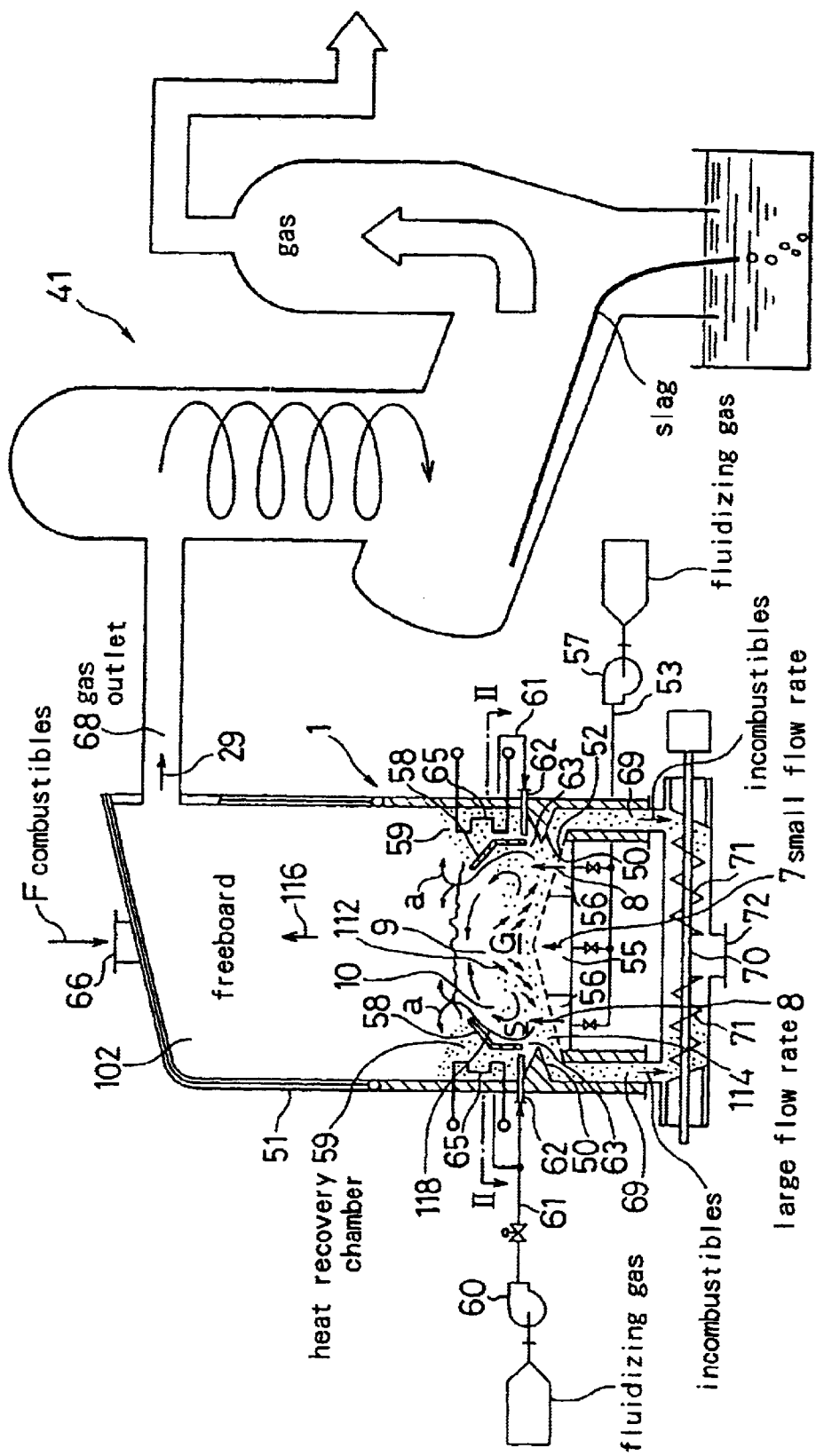
FIG. 1 is a cross-sectional view of a gasifying apparatus for carrying out a gasifying method of the present invention according to a first embodiment of the present invention.

The present invention will be described in detail with reference to the drawings. Identical reference numerals denote identical or corresponding parts throughout FIGS. 1 through 10.

Figure 2:
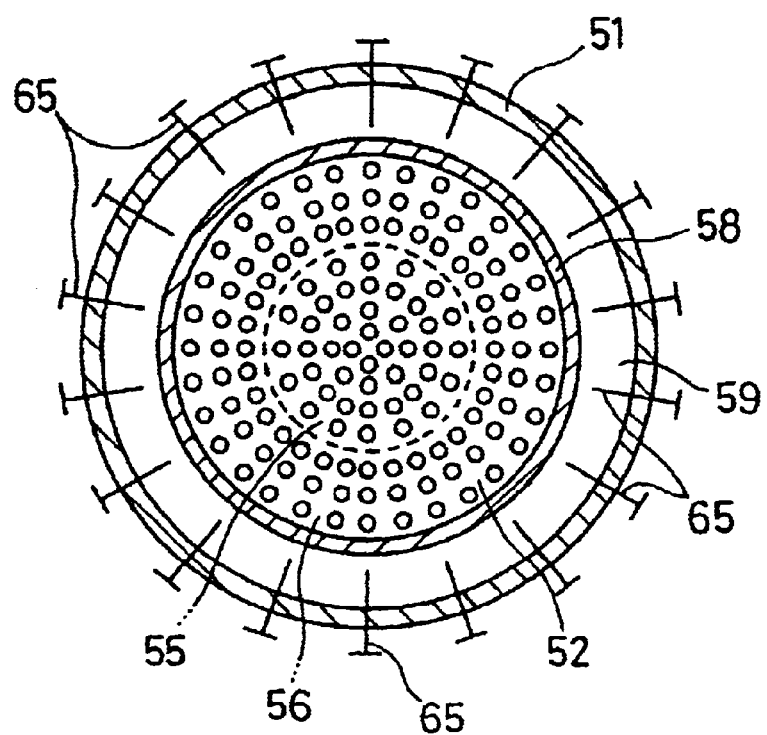
FIG. 2 is a cross-sectional view taken along line II—II of FIG. 1.

FIG. 1 shows a gasifying apparatus 1 for carrying out a gasifying method of the present invention according to a first embodiment of the present invention. A heat recovery chamber is disposed in a fluidized-bed gasification furnace. FIG. 2 is a cross-sectional view taken along line II—II of FIG. 1.

In FIG. 1, the reference numeral 51 represents a fluidized-bed gasification furnace. As shown in FIG. 2, the fluidized-bed gasification furnace 51 is of a substantially circular horizontal cross-sectional shape. A diffusion plate 52 for diffusing a fluidizing gas which is supplied by a blower 57 through a fluidizing gas inlet pipe 53 into the fluidized-bed gasification furnace 51 is disposed in a bottom of the fluidized-bed gasification furnace 51. The diffusion plate 52 is of a substantially conical shape with the peripheral area lower than the central area thereof. The fluidizing gas delivered by the blower 57 into the fluidized-bed gasification furnace 51 passes through a central fluidizing gas chamber 55 having a circular horizontal cross-sectional shape and a peripheral fluidizing gas chamber 56 having an annular horizontal cross-sectional shape, which are disposed below the diffusion plate 52, and is then ejected from the chambers 55, 56 upwardly through the diffusion plate 52. The mass flow of the fluidizing gas ejected from the peripheral fluidizing gas chamber 56 is selected to be large enough to form a fluidized bed of fluidized medium in the fluidized-bed gasification furnace 51. The mass flow of the fluidizing gas ejected from the central fluidizing gas chamber 55 is selected to be smaller than the mass flow of the fluidizing gas ejected from the peripheral fluidizing gas chamber 56.

A substantially cylindrical partition wall 58 with its upper portion bent inwardly is disposed above the peripheral fluidizing gas chamber 56 for blocking an upward flow of the fluidizing gas and deflecting the fluidizing gas ejected upwardly from the peripheral fluidizing gas chamber 56 inwardly into the central area of the furnace 51. Because of the partition wall 58 and the difference between the mass flows of the fluidizing gases, there is developed a radial swirling flow of the fluidized medium between the central and peripheral areas of the furnace 51, as indicated by the arrows in FIG. 1. The upper portion of the partition wall 58 may not be bent, and a swirling flow of the fluidized medium may be developed solely due to the difference between the mass flows of the fluidizing gases.

A gasification process will be described below. In the gasifying apparatus 1 shown in FIG. 1, a fluidizing gas supplied into the fluidizing-bed gasification furnace 51 through the diffusion plate 52 disposed at the bottom thereof comprises a central fluidizing gas 7 supplied as an upward flow from a central furnace bottom (the central fluidizing gas chamber 55) into the furnace and a peripheral fluidizing gas 8 supplied as an upward flow from a peripheral furnace bottom (the peripheral fluidizing gas chamber 56) into the furnace.

The central fluidizing gas 7 is a gas which may be one of steam, a mixture of steam and air, and air, and the peripheral fluidizing gas 8 is a gas which may be one of oxygen, a mixture of oxygen and air, and air. The total amount of air in these fluidizing gases is equal to or less than the theoretical amount of air required for combusting combustibles F, thus forming a reducing atmosphere in the furnace.

The mass flow of the central fluidizing gas 7 is smaller than the mass flow of the peripheral fluidizing gas 8, and the upward flow of the fluidizing gas in the upper peripheral furnace area is deflected toward the center of the furnace. Accordingly, a moving bed 9 where a fluidized medium (generally, silica sand is used) descends and is dispersed is formed in the central furnace area, and a fluidized bed 10 where the fluidized medium is intensely fluidized is formed in the peripheral furnace area. The fluidized medium ascends in the fluidized bed 10 in the peripheral furnace area, flows into the moving bed 9, and descends in the moving bed 9, as indicated by the arrows 118. Then, the fluidized medium flows along the diffusion plate 52, and flows into the lower part of the fluidized bed 10, as indicated by the arrows 112. In this manner, the fluidized medium circulates in the fluidized bed 10 and the moving bed a, as indicated by the arrows 118 and 112.

Combustibles F supplied from a combustible supply port 66 to an upper part of the moving bed 9 descend, together with the fluidized medium, in the moving bed 9. While the combustibles F are descending in the moving bed 9, the combustibles F are heated by the fluidized medium, and mainly volatiles thereof are gasified. Since the moving bed 9 contains no or little oxygen, a generated gas composed of the gasified volatiles is not combusted, but flows out of the moving bed 9, as indicated by the arrow 116. Therefore, the moving bed 9 forms a gasifying zone G. The generated gas that has moved into a freeboard 102 ascends and is discharged as a generated gas 29 from a gas outlet 68.

Mainly char (solid carbonaceous material) and tar 114, which are not gasified in the moving bed 9, move together with the fluidized medium from a lower part of the moving bed 9 into a lower part of the fluidized bed 10 in the peripheral furnace area, as indicated by the arrows 112, and then are combusted by the peripheral fluidizing gas 8 having a relatively large oxygen content and are partially oxidized. The fluidized bed 10 forms an oxidizing zone S. In the fluidized bed 10, the fluidized medium is heated to a high temperature by combustion heat in the fluidized bed. The high-temperature fluidized medium is deflected towards the moving bed 9 by the inclined partition wall 58, and serves again as a heat source for gasification. The temperature of the moving bed 9 is maintained in the range of 450 to 800° C. to sustain a moderate combustion reaction.

In the gasification furnace shown in FIG. 1, the gasifying zone G and the oxidizing zone S are formed in the fluidized-bed gasification furnace 51. When the fluidized medium becomes a heat transfer medium in both zones, a combustible gas of good quality having a high calorific value is generated in the gasifying zone G, and char and tar 114 which are difficult to be gasified are efficiently combusted and gasified in the oxidizing zone S. Consequently, the gasification efficiency of combustibles is increased, and a combustible gas of good quality can be generated.

Since the char is uniformly diffused in the peripheral furnace area by the swirling flow, the char can efficiently be oxidized, thus preventing unreacted oxygen from ascending and oxidizing the above generated gas. Therefore, the gas is prevented from being oxidized, the gasification efficiency is high, and since the char is efficiently oxidized, the percentage of energy recovery is high.

Inasmuch as there is a lateral flow on the furnace bottom due to the swirling flow, even if uncrushed large incombustibles are present, they will not be accumulated, but can be discharged. Thus, the raw material can be charged into the furnace in an uncrushed state.

The swirling flow promotes heat diffusion in the furnace, thus preventing sand from being agglomerated, allowing a load imposed on the furnace to be increased, and making the furnace compact.

Figure 9:
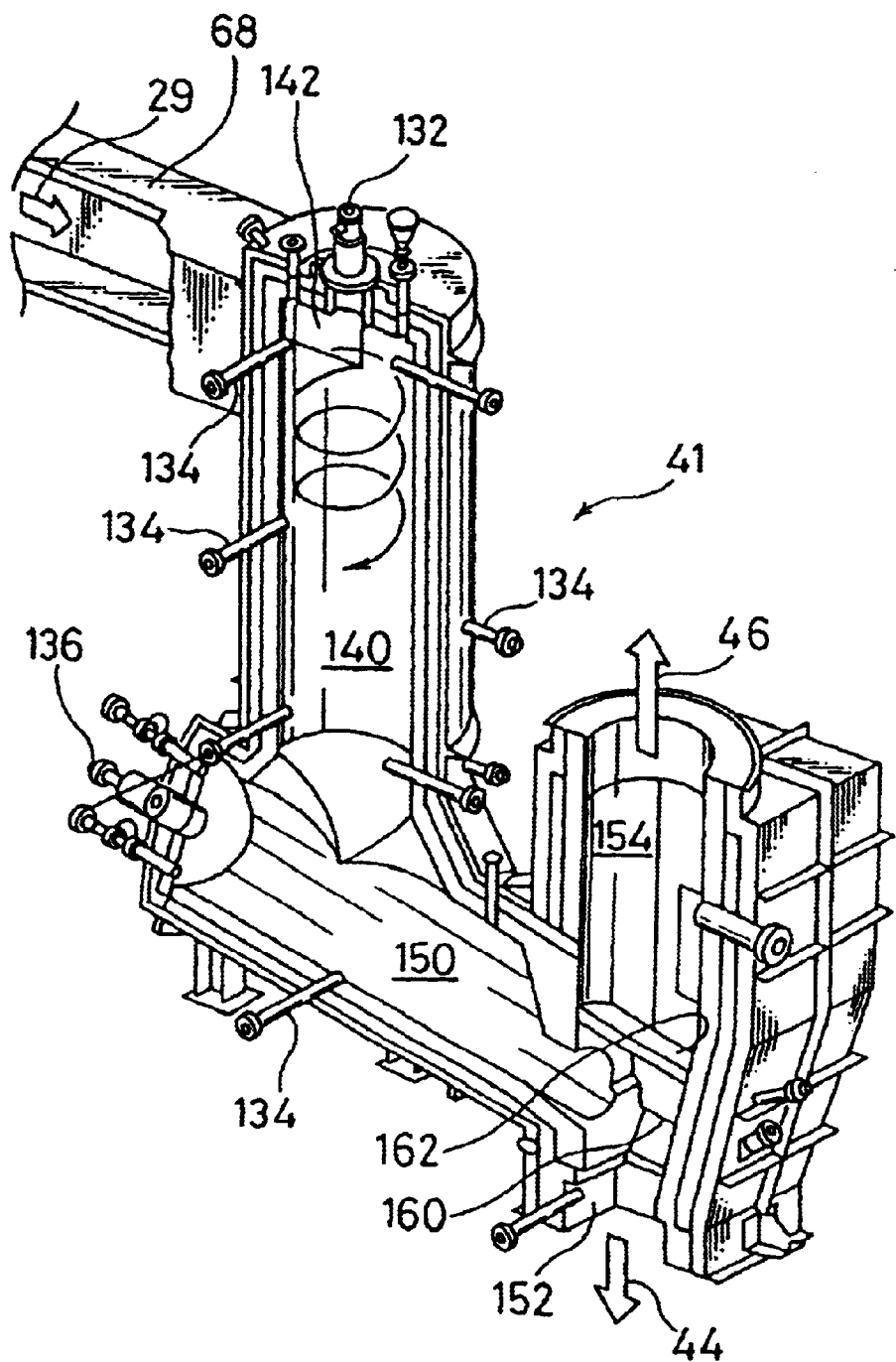
FIG. 9 is a perspective view, partly cut away, of a melt combustion apparatus according to an embodiment of the present invention.

In the embodiment shown in FIG. 1, the generated gas and char 29 are delivered from the gas outlet 68 through a duct to a melt combustion furnace 41 shown in FIG. 9. The generated gas 29 which is delivered is kept at a temperature of 900° C. or lower, e.g., at a temperature ranging from 700 to 750° C. In order to keep the gas 29 in this temperature range, the amount of the fluidizing gas is adjusted by an air diffuser in a heat recovery chamber (described later on), and the amounts of the peripheral and central fluidizing gases for forming the moving bed and the fluidized bed are adjusted to prevent the temperature of the fluidized medium from being raised excessively, so that the temperature of the gas delivered from the freeboard to the duct will be 900° C. or lower.

By adjusting the amount of air supplied to the melt combustion furnace, the combustible gas and the char may be completely combusted in the melt combustion furnace, and the generated waste heat may be recovered by a combined-cycle power generation system. Alternatively, the combustible gas and the char are incompletely combusted to obtain a combustible gas.

The heat recovery chamber, the air diffuser in the heat recovery chamber, and the circulation of the fluidized medium will be described below.

As shown in FIGS. 1 and 2, an annular heat recovery chamber 59 is formed between the partition wall 58 and the furnace wall. In operation, a portion of the fluidized medium flows over the partition wall 58 into the heat recovery chamber 59, as indicated by the arrows a. Air diffusers 62 for introducing gas from a blower 60 through an inlet pipe 61 are disposed at a level higher than a furnace bottom in a lower part of the heat recovery chamber 59. An opening 63 is set near the air diffusers 62 in the heat recovery chamber. The fluidized medium that has entered the heat recovery chamber 59 descends while forming a moving bed continuously or intermittently depending on operating conditions, and the fluidized medium circulates into a combustion region (the fluidized bed 10).

The descending rate of the fluidized medium is controlled by the amount of the fluidizing gas supplied from the air diffuser in the heat recovery chamber and supplied to the combustion region. Specifically, the feeding rate $G_1$ of the fluidized medium to the heat recovery chamber 59 increases when the amount of the fluidizing gas ejected from the diffusion plate for fluidizing the combustion region, particularly the amount of the fluidizing gas ejected from the peripheral fluidizing gas chamber 56, increases. When the amount of the fluidizing gas in the heat recovery chamber varies in the range of 0 to 1 Gmf, the descending rate of the fluidized medium in the heat recovery chamber varies substantially proportionally. The descending rate of the fluidized medium in the heat recovery chamber becomes substantially constant when the amount of the fluidizing gas in the heat recovery chamber is 1 Gmf or greater. The descending rate of the fluidized medium in the heat recovery chamber is essentially equal to the feeding rate $G_1$ of the fluidized medium to the heat recovery chamber 59. The descending rate of the fluidized medium in the heat recovery chamber is also equal to the feeding rate $G_1$ of the fluidized medium to the heat recovery chamber 59. The descending rate of the fluidized medium in the heat recovery chamber 59 can be controlled by adjusting both of the amounts of the fluidizing gases.

Heat transfer tubes 65 which are connected to a waste heat boiler and allow heating medium to pass therethrough are disposed in the heat recovery chamber 59 to recover heat from the fluidized medium by means of a heat exchange with the fluidized medium which moves downwardly in the heat recovery chamber 59. The heat transfer coefficient in the heat recovery chamber greatly varies if the amount of the fluidizing air supplied to the heat recovery chamber varies from 0 to 3 Gmf.

In order to control the heat recovery rate, the circulating rate of the fluidized medium and the heat transfer coefficient are simultaneously controlled. Specifically, when the amount of the fluidizing gas in the combustion chamber is constant, and then the amount of the fluidizing gas in the heat recovery chamber increases, the circulating rate of the fluidized medium increases and the heat transfer coefficient also increases, thus greatly increasing the heat recovery rate due to a synergistic effect. This is effective to prevent the temperature of the fluidized medium in the fluidized bed from increasing beyond a predetermined temperature. Therefore, even if the combustibles are plastics or the like whose combustion temperature is high, the temperature of the fluidized bed region (the fluidized bed 10 and the moving bed 9) can be controlled at a temperature ranging from 450 to 800° C., with the result that the temperature of the freeboard can be controlled at a temperature of 900° C. or less, e.g. a temperature ranging from 700 to 750° C.

Various devices may be employed as means for introducing gas into the heat recovery chamber 59. Generally, a diffuser or a diffusion nozzle is horizontally installed. If openings for introducing the gas are made uniform with respect to the entire furnace bottom, then the amount of gas supplied per unit area is made uniform over the entire furnace bottom irrespective of the amount of the gas supplied to the air diffuser. As the amount of the gas supplied to the air diffuser gradually increases, the state of the fluidized medium in the heat recovery chamber changes from a fixed bed to a moving bed and further to a fluidized bed beyond a certain amount of supplied gas.

In FIG. 1, the reference numeral 66 represents a combustible supply port disposed on an upper portion of the furnace 51. A steam drum (not shown) of a waste heat boiler connected to the melt combustion furnace and the heat transfer tubes 65 in the heat recovery chamber 59 form a circulation path. The reference numeral 69 represents an incombustible discharge port connected to an outer periphery of the diffusion plate 52 at the furnace bottom, and the reference numeral 70 represents a screw conveyor having a screw 71.

A material F to be combusted (combustibles) which is charged into the furnace 51 from the combustible supply port 66 flows together with the fluidized medium which swirls and is fluidized due to the fluidizing gas is combusted to produce a gas. At this time, the fluidized medium in the vicinity of the upper central area above the fluidizing gas chamber 55 does not make violent vertical motion, but forms a downward moving bed which is in a weak fluidizing state. The moving bed has a constricted upper part and a spreading lower part because of the slanted shape of the diffusion plate 52. Since a portion of the spreading lower part faces an upper part of the peripheral fluidizing gas chamber 56, the fluidized medium at the portion of the spreading lower part is blown upwardly by the fluidizing gas ejected from the fluidizing gas chamber with a large mass flow. Therefore, the fluidized medium in the portion of the spreading lower part is removed to thus allow the bed immediately above the fluidizing gas chamber 55 to descend by gravity. Above this bed, the fluidized medium supplied from the fluidized bed is deposited. The above-described action is repeated so that the fluidized medium above the fluidizing gas chamber 55 gradually forms a moving bed that descends continuously.

The fluidized medium that has moved onto the fluidizing gas chamber 56 is blown upwardly, and deflected by the partition wall 58 toward the central area of the furnace 51. The fluidized medium then drops onto the top of the moving bed in the central area, and is circulated again as described above. A part of the fluidized medium flows over the partition wall 58 into the heat recovery chamber 59, as indicated by the arrows a. In case that the descending speed of the fluidized medium deposited in the heat recovery chamber 59 is low, then an angle of repose is formed at the upper area of the heat recovery chamber 59, and any excessive fluidized medium drops over the partition wall into the combustion region.

The fluidized medium that has entered the heat recovery chamber 59 forms a descending moving bed which is mildly fluidized by the fluidizing gas introduced from the air diffusers 62 and descends gradually. After heat exchange with the heat transfer tubes 65, the fluidized medium flows back from the open 63 to the combustion region.

If the material F to be combusted contains incombustibles that are greater in diameter than the fluidized medium, then the incombustibles are discharged together with a part of the fluidized medium by the screw conveyor 70 at the furnace bottom.

Heat transfer in the heat recovery chamber 59 includes a heat transfer caused by direct contact between the fluidized medium and the heat transfer tubes 65 and a heat transfer caused by contact between the heat transfer tubes 65 and ascending gas which vibrates violently irregularly because of the flow of the fluidized medium. Compared with the heat transfer due to the ordinary gas-solid contact, the latter heat transfer has a very large heat transfer coefficient unlike a heat transfer from a powder in a stationary condition, because almost no boundary layer which is an obstacle to heat transfer is present on a solid surface and the fluidized medium is well stirred by its fluidization. Therefore, the heat recovery chamber according to the present invention can have a heat transfer coefficient which is about 10 times that of usual combustion gas boilers.

As described above, the heat transfer between the fluidized medium and the heat transfer surface largely depends on the intensity of the flow. The rate of the circulating fluidized medium can be controlled by adjusting the amount of the fluidizing gas introduced from the air diffusers 62. Since the heat recovery chamber 59 for recovering heat from the moving bed is separated from the combustion chamber in the furnace, the heat recovery chamber may be compact, provide a large turn-down ratio, and be controlled well.

By adjusting the amounts of the central fluidizing gas 7 and the peripheral fluidizing gas 8, the temperature in the combustion chamber (the moving bed 9 and the fluidized bed 10) is controlled. Therefore, a combination of the temperature control in the heat recovery chamber and the temperature control in the combustion chamber based on the fluidizing gases 7, 8 can be carried out. The former temperature control may be the main temperature control, and the latter temperature control may be auxiliary temperature control, or vice versa. Irrespective of whether the temperature control in the heat recovery chamber is the main temperature control or an auxiliary temperature control, the temperature in the chamber under the main temperature control is varied largely, and the temperature in the chamber under the auxiliary temperature control is kept substantially constant.

The incombustible discharge port 69 may be positioned in, contact with the opening 63 beneath the partition wall 58 and the periphery of the diffusion plate 52 in the furnace 51 for supplying the fluidizing gas, as illustrated. However, the position of the incombustible discharge port 69 is not limited to the illustrated position.

It is preferable to provide a partition wall 50 for preventing the fluidized medium from being discharged from the heat recovery chamber 59 into the incombustible discharge port 69 and for returning the medium, after having transferred the heat, effectively to the fluidized bed in the combustion chamber.

Figure 3:
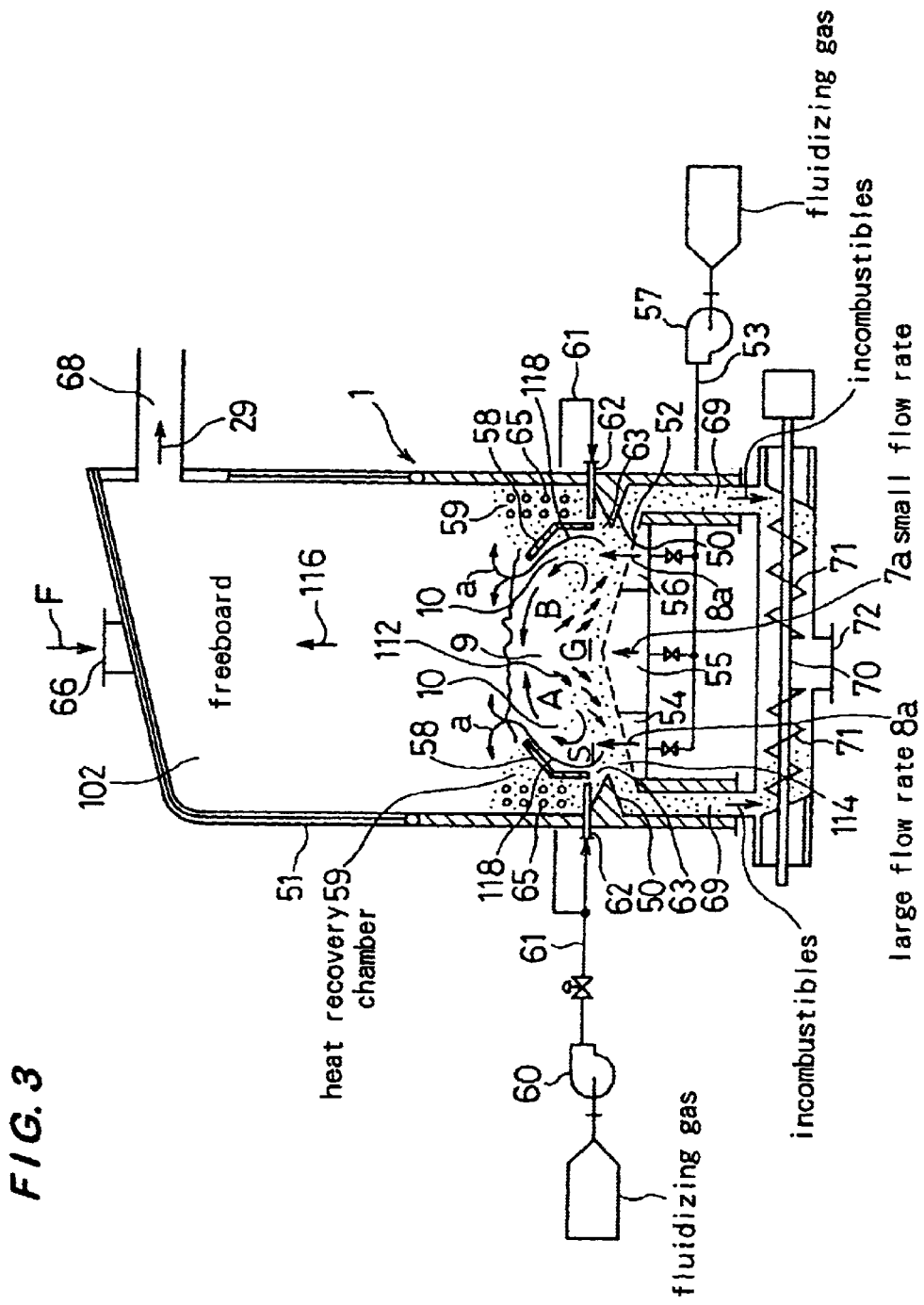
FIG. 3 is a cross-sectional view of a gasifying apparatus for carrying out a gasifying method of the present invention according to a second embodiment of the present invention.

FIG. 3 shows a second embodiment of the present invention. In the embodiment shown in FIG. 3, a fluidized-bed furnace 51 is of a substantially rectangular horizontal cross-sectional shape. The interior of the furnace is divided by a partition wall 58 into a central combustion region having a rectangular horizontal cross-sectional shape and two heat recovery chambers 59 having a rectangular horizontal cross-sectional shape and disposed in opposite sides of the furnace.

In FIG. 3, a diffusion plate 52 for supplying a fluidizing gas which is introduced by a blower 57 through a fluidizing gas inlet pipe 53 into the furnace 51 is disposed in the furnace bottom. The diffusion plate 52 is of a stand-like cross-sectional shape (roof-like) with its opposite side edge lower than the center thereof, and is substantially symmetrical with respect to the central line of the furnace 51. The fluidizing gas delivered from the blower 57 passes through fluidizing gas chambers 54, 55, 56, and is then ejected upwardly through the diffusion plate 52. The mass flow of the fluidizing gas ejected from the fluidizing gas chambers 54, 56 on the opposite sides is selected to be large enough to form a fluidized bed of fluidized medium in the furnace 51. The mass flow of the fluidizing gas ejected from the central fluidizing gas chamber 55 is selected to be smaller than the mass flow of the fluidizing gas ejected from the fluidizing gas chambers 54, 56 on the opposite sides.

A plate-like partition wall 58 with its upper portion bent inwardly is disposed above the peripheral fluidizing gas chambers 54, 56 on the opposite sides for blocking an upward flow of the fluidizing gas and deflecting the fluidizing gas ejected upwardly from the fluidizing gas chambers 54, 56 inwardly toward the central region of the furnace 51. Because of the partition wall 58 and the difference between the mass flows of the ejected fluidizing gases, two swirling flows A, B are formed, as indicated by the arrows in FIG. 3. Furthermore, the upper portion of the partition wall 58 may not be bent, and swirling flows may be formed only due to the difference between the mass flows of the fluidizing gases.

A gasification process will be described below. In the gasifying apparatus 1 shown in FIG. 3, a fluidizing gas supplied into the fluidizing-bed furnace 51 through the diffusion plate 52 disposed at the bottom thereof comprises a first fluidizing gas 7a supplied as an upward flow from a central furnace bottom region (the fluidizing gas chamber 55) into the furnace and two second fluidizing gases 8a supplied as an upward flow from opposite sides of the furnace bottom (the fluidizing gas chambers 54, 56) into the furnace.

The first fluidizing gas 7a is a gas which may be one of steam, a mixture of steam and air, and air, and the second fluidizing gases 8a are gases which may be one of oxygen, a mixture of oxygen and air, and air. The amount of oxygen contained in the first fluidizing gas is equal to or smaller than the amount of oxygen contained in the second fluidizing gases. The total amount of air contained in these fluidizing gases is preferably equal to or less than 30% of a theoretical amount of air required for combusting combustibles F, thus forming a reducing atmosphere in the furnace.

The mass flow of the first fluidizing gas 7a is smaller than the mass flow of the second fluidizing gases 8a, and the upward flow of the fluidizing gas in the upper side furnace regions is turned toward the center of the furnace. Accordingly, a moving bed 9 where a fluidized medium (generally, silica sand is used) descends and is dispersed is formed in the central furnace region (a first region), and a fluidized bed 10 where the fluidized medium is intensely fluidized is formed in the opposite furnace regions (two second regions). The fluidized medium ascends in the fluidized bed 10 in the opposite furnace regions, flows inwardly to in the moving bed 9 in the central furnace region, and descends in the moving bed 9, as indicated by the arrows 118. Then, the fluidized medium moves along the diffusion plate 52 and moves to the lower portion of the fluidized bed 10, as indicated by the arrows 112. In this manner, the fluidized medium circulates in the fluidized bed 10 and the moving bed a, as indicated by the arrows 118, 112.

Combustibles F supplied from the combustible supply port 66 to an upper part of the moving bed 9 descend, together with the fluidized medium, in the moving bed 9. While the combustibles F are descending in the moving bed 9, the combustibles F are heated-up by the heat of the fluidized medium, and mainly volatiles thereof are gasified. Since the moving bed 9 contains no or little oxygen, a generated gas composed of the gasified volatiles is not combusted, but flows out of the moving bed 9, as indicated by the arrow 116. Therefore, the moving bed 9 forms a gasifying zone G. The generated gas that has moved into a freeboard 102 ascends and is discharged as a generated gas 29 from a gas outlet 68. A portion of the fluidized medium flows over the partition wall 58 into the heat recovery chambers 59, as indicated by the arrows a. While the heat recovery chamber 59 has an annular horizontal cross-sectional shape in the embodiment shown in FIG. 1, each of the heat recovery chambers 59 has a rectangular horizontal cross-sectional shape in the embodiment shown in FIG. 3. Other structural details and operation of the embodiment shown in FIG. 3 are the same as those of the embodiment shown in FIG. 1.

Figure 4:
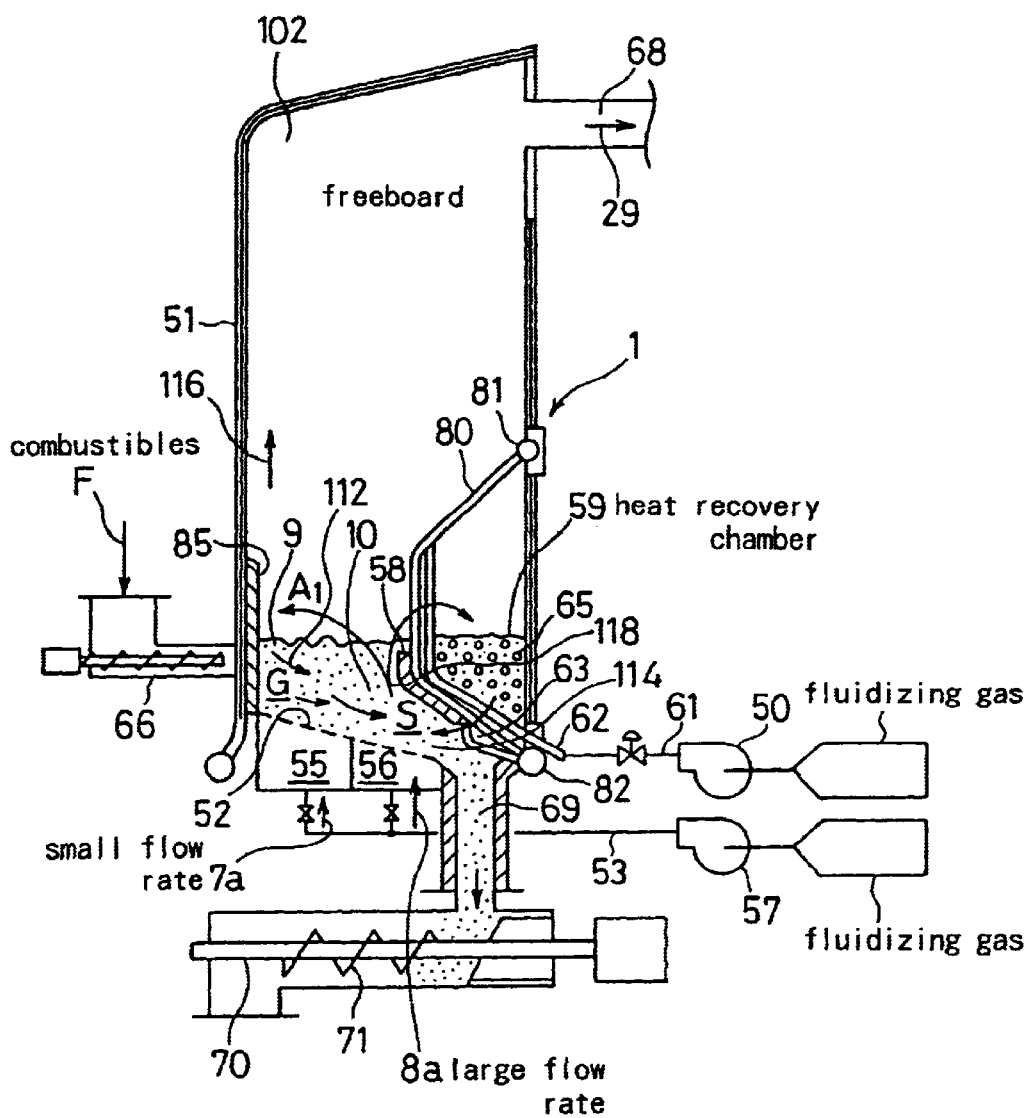
FIG. 4 is a cross-sectional view of a gasifying apparatus for carrying out a gasifying method of the present invention according to a third embodiment of the present invention.

FIG. 4 shows a third embodiment of the present invention. In this embodiment, a partition wall 58 has its shape different from the embodiment shown in FIG. 3 and is attached in a manner different from the embodiment shown in FIG. 3. Two swirling flows A, B are formed in the embodiment shown in FIG. 3, while a single swirling flow $A_1$ is formed in the embodiment shown in FIG. 4.

In FIG. 4, the reference numeral 80 represents water pipes, and the reference numerals 81, 82 represent headers mounted on an outer wall. In the embodiment shown in FIG. 4, the furnace wall is made of membrane outer walls. The water pipes 80 are branched from the headers 81, 82 disposed in upper and lower positions on the membrane outer walls, and a partition wall made of a membrane wall is obliquely attached to lower slanted portions of the water pipes 80, thus providing the partition wall 58.

The water pipes shown in FIG. 4 are bent at one or two points for absorbing thermal expansion. Since the water pipes are fixed to the upper and lower headers 81, 82, the water pipes are capable of withstanding violent flows of the fluidized medium. The water pipes 80 have sufficiently long vertical portions extending through the upper surface of the fluidized bed, so that no impurities will be deposited in upper slanted portions of the water pipes 80.

The mass flow of the first fluidizing gas 7a from the fluidizing gas chamber 55 is smaller than the mass flow of the second fluidizing gas 8a from the fluidizing gas chamber 56. An upper part above the fluidizing gas chamber 55 serves as a gasifying zone G (a first region), and an upper region above the fluidizing gas chamber 56 serves as an oxidizing zone S (a second region). In this embodiment, the furnace 51 is of a rectangular shape, a single swirling flow is built up, and a single heat recovery chamber 59 is provided. Operation of the gasifying apparatus according to this embodiment is the same as the embodiments shown in FIGS. 1 and 3.

Figure 5:
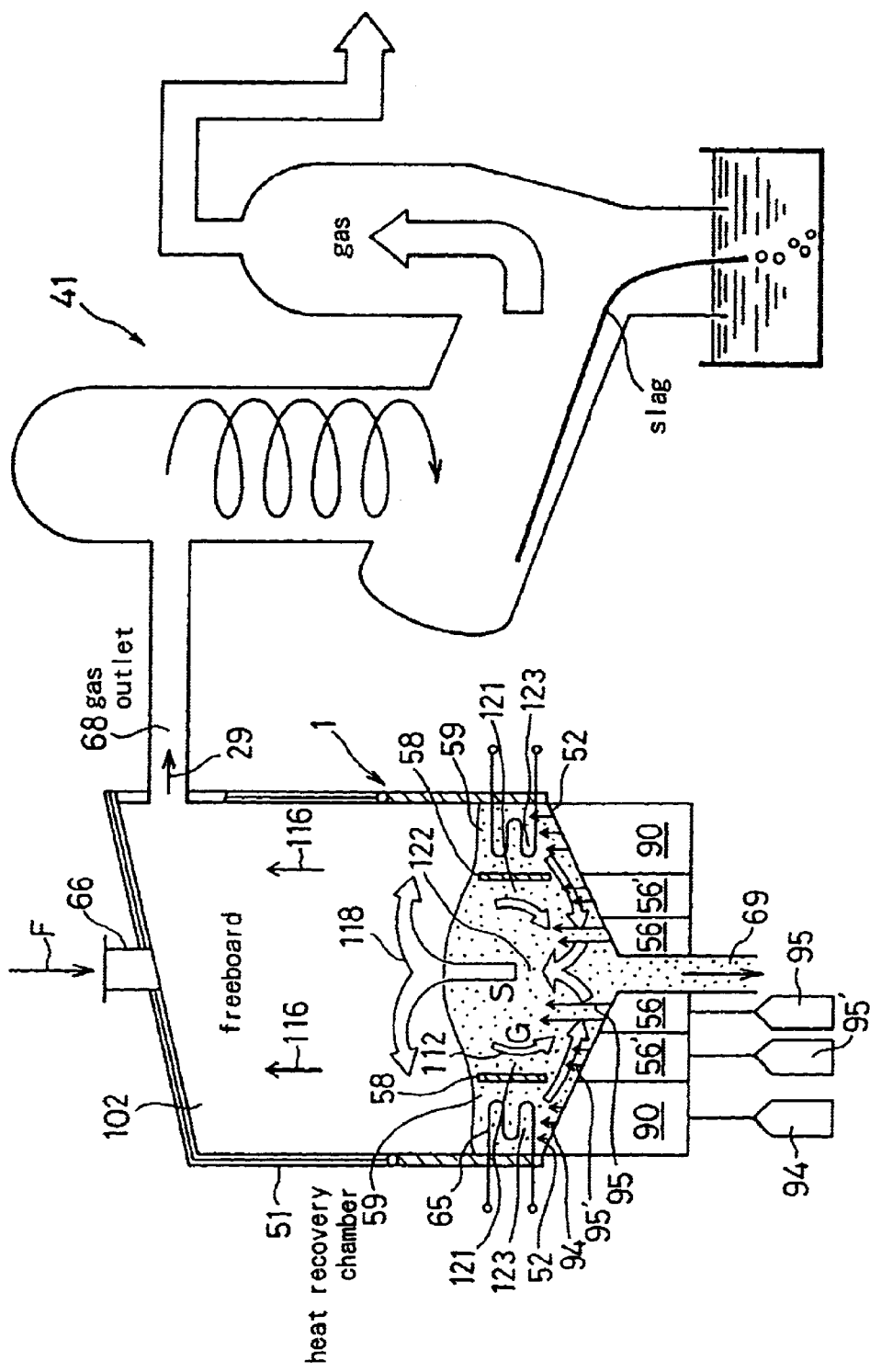
FIG. 5 is a cross-sectional view of a gasifying apparatus for carrying out a gasifying method of the present invention according to a fourth embodiment of the present invention.

FIG. 5 shows a fourth embodiment of the present invention. In this embodiment, a fluidized-bed furnace 51 is of a substantially circular horizontal cross-sectional shape. The interior of the fluidized-bed furnace 51 is divided into an annular heat recovery chamber 59 and a circular combustion region for forming a partial combustion fluidized bed, by a vertical cylindrical partition wall 58. The heat recovery chamber 59 and the combustion region are connected to each other above and below the partition wall 59, so that a fluidized medium can move between the heat recovery chamber 59 and the combustion region. The fluidized-bed furnace 51 has a gas outlet 68 for delivering a generated gas to a melt combustion furnace 41. Heat transfer tubes 65 are disposed in the heat recovery chamber 59 for recovering heat from the fluidized medium.

A diffusion plate 52 is disposed beneath the combustion region, and fluidizing gas chambers 56, 56' are disposed beneath the diffusion plate 52 for introducing fluidizing gases 95, 95', respectively, through respective joint ports. The fluidizing gas 95' is ejected from the fluidizing gas chamber 56' to give a substantially small fluidizing speed, resulting in a weak fluidizing area 121 in the vicinity of the partition wall 58. The fluidizing gas 95 is ejected from the fluidizing gas chamber 56 to give a substantially large fluidizing speed, resulting in an active fluidizing region 122 in the center of the combustion region.

Since two different fluidizing areas are present in the fluidized bed in the combustion region, there is developed a swirling flow in which the fluidized medium descends in the weak fluidizing region 121 and ascends in the active fluidizing region 122.

The diffusion plate 52 is also disposed beneath the heat recovery chamber 59. A fluidizing gas chamber 90 is disposed beneath the diffusion plate 52 for introducing a fluidizing gas 94 through a joint port. The fluidizing gas 94 is ejected from the fluidizing gas chamber 90 to give a substantially small fluidizing speed, resulting in a weak fluidizing region 123 in the heat recovery chamber 59.

These fluidizing regions in the combustion region having different fluidizing speeds are combined to develop the following flows: In the combustion region, the fluidized medium ascends with an upward flow 118 in the intense fluidizing area 122. Near the surface, the ascending fluidized medium turns into a horizontal flow toward the weak fluidizing area 121, in which the fluidized medium turns into a descending flow 112. A portion of the horizontal flow goes beyond the upper edge of the partition wall 58 into the heat recovery chamber 59.

In the heat recovery chamber 59, a descending flow is developed because of the weak fluidizing region 123 therein. The fluidized medium flows back to the combustion chamber with a returning flow passing through the communication port below the partition wall 58. Therefore, an internal swirling flow is developed in the combustion region, and a mutual circulating flow is developed between the partial combustion fluidized bed in the combustion region and the fluidized bed in the heat recovery chamber.

When combustibles are charged from a combustible supply port 66 on the top of the fluidized-bed furnace 51, the combustibles are uniformly dispersed and mixed by the internal swirling flow, and are gasified by partial combustion.

The heat generated when the combustibles are partially combusted serves partly as a heat source for gasification. The fluidized medium flows beyond the upper edge of the partition wall 58 into the heat recovery chamber 59, in which it forms a descending flow. Thereafter, the fluidized medium is returned through the passage below the partition wall to the partial combustion fluidized bed. The heat held by the fluidized medium is recovered and taken out by the heat transfer tubes 65.

A portion of the energy of the charged combustibles is converted into a gas and can be recovered as chemical energy, and a portion of the energy of the charged combustibles can be effectively recovered as heat energy with high efficiency.

Incombustibles are often contained in the charged combustibles. Such incombustibles are discharged from an incombustible discharge port 69 located in the center of the partial combustion fluidized bed. For discharging incombustibles smoothly, the furnace bottom is slanted downwardly in a conical shape toward the incombustible discharge port 69.

In the embodiment shown in FIG. 5, an upward flow of the fluidized medium is developed in the center of the combustion region, and a downward flow of the fluidized medium is developed in the vicinity of the vertical partition wall 58. However, as in the embodiment shown in FIG. 1, an upward flow of the fluidized medium may be developed in the vicinity of the partition wall 58, and a downward flow of the fluidized medium may be developed in the center of the combustion region.

Figure 6:
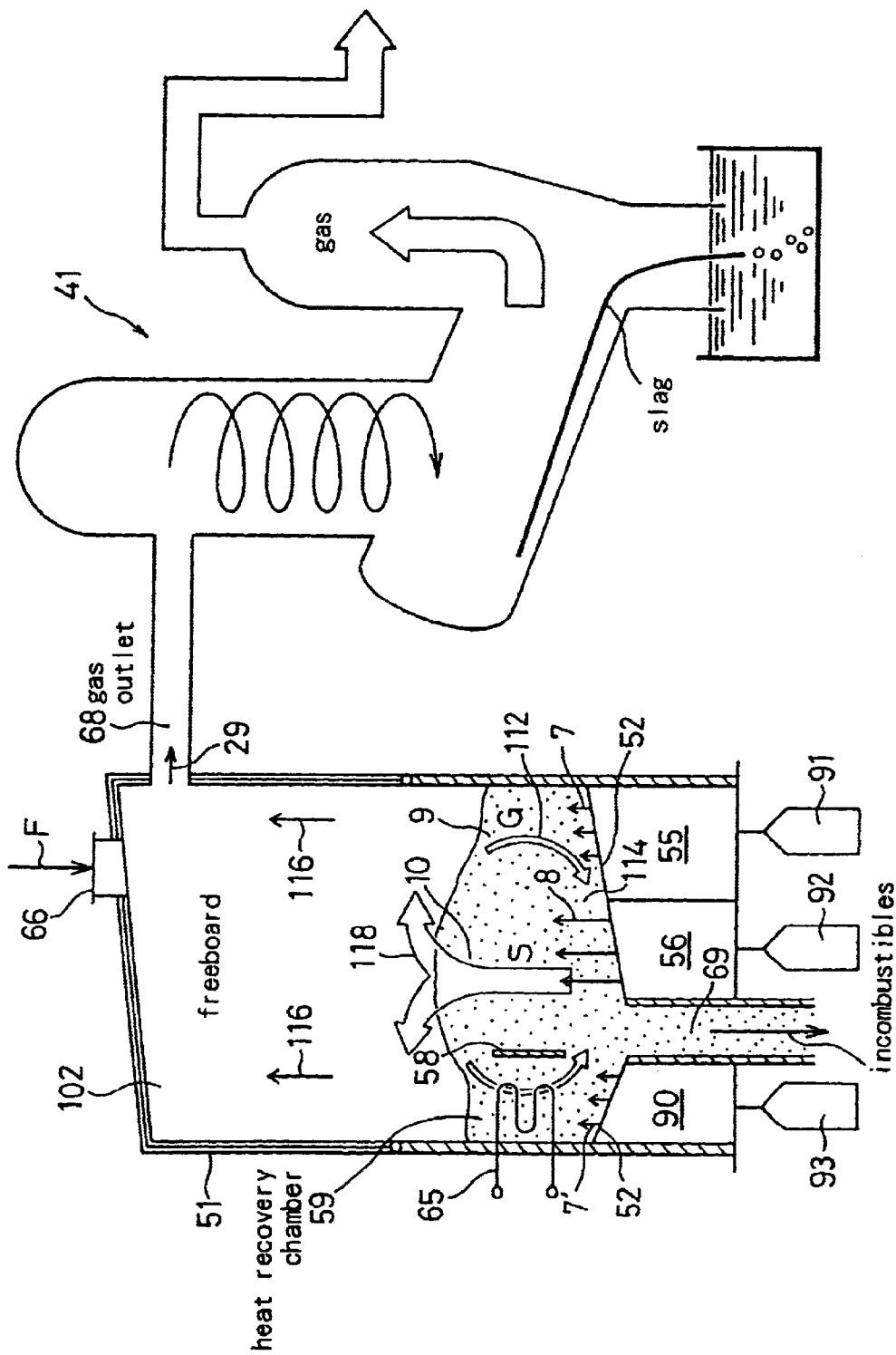
FIG. 6 is a cross-sectional view of a gasifying apparatus for carrying out a gasifying method of the present invention according to a fifth embodiment of the present invention.

FIG. 6 shows a fifth embodiment of the present invention. In the embodiment shown in FIG. 6, a fluidized-bed furnace 51 has a substantially rectangular horizontal cross-sectional shape. The fluidized-bed furnace 51 is divided into a combustion region and a heat recovery chamber 59 by a vertical partition wall 58. Fluidizing gases 91, 92, 93 supplied from the furnace bottoms of the combustion region and the heat recovery chamber 59 respectively through a peripheral fluidizing gas chamber 55, a central fluidizing gas chamber 56, and a heat recovery fluidizing gas chamber 90, and are ejected from a diffusion plate 52 above the chambers as upward flows 7, 8, 7' into the furnace.

The mass flow of the fluidizing gas 8 is greater than the mass flows of the fluidizing gases 7, 7'.

The fluidizing gas 8 is a gas which may be one of oxygen, a mixture of oxygen and air, and air, and the fluidizing gas 7 is a gas which may be one of steam, a mixture of steam and air, and air. The total amount of oxygen contained in the fluidizing gas 8 is preferably equal to or less than the amount of oxygen contained in the fluidizing gas 7. The total amount of air in the fluidizing gases is preferably 30% or less of a theoretical amount of combustion air required for combusting combustibles F, thus forming a reducing atmosphere in the furnace.

The mass flow of the fluidizing gas 7 is smaller than the mass flow of the fluidizing gas 8. An upward flow of the fluidizing gas in an upper central furnace area is deflected toward a peripheral furnace area, thus forming a moving bed 9 where a fluidized medium (generally, silica sand is used) descends and is dispersed in the peripheral furnace area, and a fluidized bed 10 where the fluidized medium is intensely fluidized in the central furnace area. The fluidized medium ascends in the fluidized bed 10 in the central furnace area, flows into the upper part of the moving bed 9, and descends in the moving bed 9, as indicated by the arrows 118. Then, the fluidized medium flows along a diffusion plate 52 and flows into the lower part of the fluidized bed 10, as indicated by the arrows 112. In this manner, the fluidized medium circulates in the fluidized bed 10 and the moving bed 10, as indicated by the arrows 118, 112.

Combustibles F supplied from a combustible supply port 66 to an upper part of the moving bed 9 descend, together with the fluidized medium, in the moving bed 9. While the combustibles F descend in the moving bed 9, the combustibles F are heated by the fluidized medium, and mainly volatiles thereof are gasified. Since the moving bed 9 contains no or little oxygen, a generated gas composed of the gasified volatiles is not combusted, and flows out of the moving bed 9, as indicated by the arrows 116. Therefore, the moving bed 9 forms a gasifying zone G. The generated gas that has moved into a freeboard 102 ascends and is discharged as a generated gas 29 from a gas outlet 68.

Mainly char (solid carbonaceous material) and tar 114, which are not gasified in the moving bed 9, move together with the fluidized medium from a lower part of the moving bed 9 into a lower part of the fluidized bed 10 in the central furnace area, as indicated by the arrows 112, and then are combusted by the fluidizing gas 8 having a relatively large oxygen content and are partially oxidized. The fluidized bed 10 forms an oxidizing zone S for combustibles. In the fluidized bed 10, the fluidized medium is heated up to a high temperature by the combustion heat. The high-temperature fluidized medium is turned back into the moving bed 9 in an upper central furnace area, and serves again as a heat source for gasification. The temperature of the fluidized bed area (the fluidized bed 10 and the moving bed 9) is maintained in the range of 450 to 800° C. to sustain a controlled combustion reaction.

The gas outlet 68 is connected to a melt combustion furnace 41 as in the embodiment shown in FIG. 1. An annular heat recovery chamber 59 is formed between the partition wall 58 and the furnace wall. During operation, a portion of the fluidized medium flows over the partition wall 58 into the heat recovery chamber 59. The fluidized medium that has entered the heat recovery chamber 59 descends while forming a moving bed continuously or intermittently depending on operating conditions, with the fluidizing gas 7' blown upwardly through the fluidizing gas chamber 90 from the diffusion plate 52, conducts a heat exchange with heat transfer tubes 65, and then flows back into the combustion region. The amount of the fluidized medium which descends is controlled by the amount of the fluidizing gas 7' and the amounts of the fluidizing gases 7, 8 in the combustion region.

Figure 7:
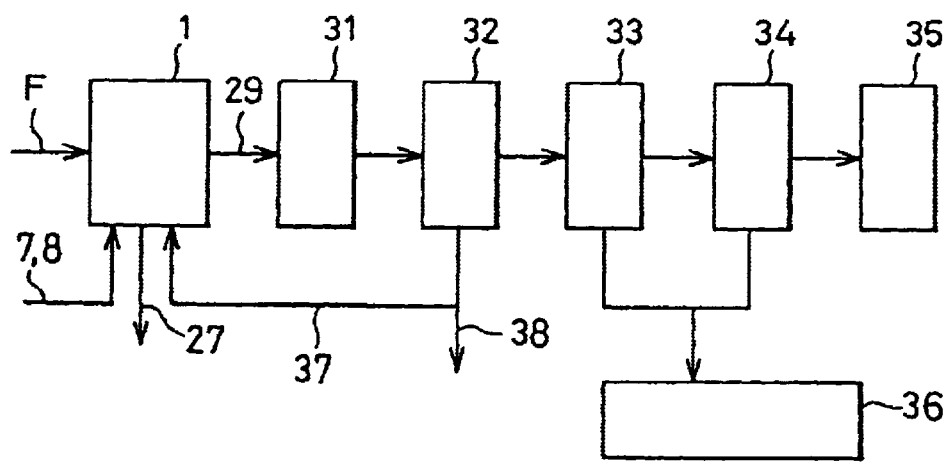
FIG. 7 is a flowchart of a generated gas refining process according to an embodiment of the present invention.

FIG. 7 is a process flowchart of refining a generated gas produced by a gasifying apparatus according to the present invention. In the refining process shown in FIG. 7, a material F for gasification and fluidizing gases 7, 8 are supplied to a gasifying apparatus 1. A combustible gas generated in the gasifying apparatus 1 is cooled in a waste heat boiler 31 which recovers the heat from the generated gas. The generated gas is delivered to a cyclone separator 32, which separates solids 37, 38 from the generated gas. Thereafter, the generated gas is cleansed and cooled by water in a water scrubber 33, and hydrogen sulfide is removed from the generated gas by an alkali solution scrubber 34. Thereafter, the generated gas is stored in a gas holder 35. In the solids separated by the cyclone separator 32, unreacted char 37 is returned to the gasifying apparatus 1, and the remaining solid 38 is discharged out of the system. In the incombustibles discharged from the gasifying apparatus 1, large incombustibles 27 are discharged out of the system, and sand is returned to the gasifying apparatus 1. Waste water discharged from the scrubbers 33, 34 is delivered to a waste water treatment equipment 36 in which the waste water is treated to be harmless.

Figure 8:
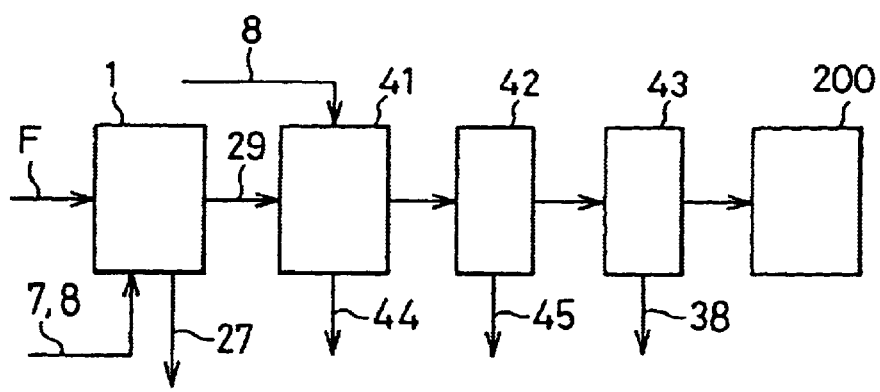
FIG. 8 is a flowchart of a process in which ash is melted according to an embodiment of the present invention.

FIG. 8 is a process flowchart in which a combustible gas and fine particles (comprising ash, char and tar) generated in a gasifying apparatus 1 are introduced into a melt combustion furnace 41, and the combustible gas and the fine particles are combusted at a high temperature to thus melt ash in the melt combustion furnace 41. In the process shown in FIG. 8, a generated gas containing a large amount of combustibles which is produced in the gasifying apparatus 1 is introduced into the melt combustion furnace 41. Oxygen, a mixture of oxygen and air, or air is blown into the melt combustion furnace 41 to combust the combustible gas and the fine particles at a temperature of 1300° C. or higher, thus melting the ash and decomposing harmful substances including dioxin, PCB, etc. The ash 44 melted in the melt combustion furnace 41 is quenched into slag, so that the volume of the ash is reduced. An exhaust gas produced in the melt combustion furnace 41 is quenched by a scrubber 42 to prevent dioxin from being resynthesized. The quenched exhaust gas is filtered in a filter 43 to remove dust 38 therefrom, and then the filtered exhaust gas is discharged through an exhaust stack 200 into the atmosphere.

FIG. 9 shows a melt combustion apparatus according to the present invention. In FIG. 9, the gas outlet 68 of the gasifying apparatus 1 shown in FIGS. 1, 3, 4, 5 and 6 is connected to a combustible gas inlet 142 of a melt combustion furnace 41. The melt combustion furnace 41 includes a cylindrical primary combustion chamber 140 having a substantially vertical axis and a secondary combustion chamber 150 which is inclined in a horizontal direction. A combustible gas 29 and fine particles produced in a fluidized-bed furnace 51 are supplied through the combustible gas inlet 142 to the primary combustion chamber 140 so as to swirl around the axis thereof.

The primary combustion chamber 140 has a start-up burner 132 mounted on its top and also has a plurality of air nozzles 134 for supplying combustion air so as to swirl around the axis thereof. The secondary combustion chamber 150 communicates with the lower end of the primary combustion chamber 140. The secondary combustion chamber 150 has a discharge port 152 disposed in a lower portion thereof for discharging molten ash, an exhaust gas discharging port 154 disposed above the discharge port 152, an auxiliary burner 136 disposed in the vicinity of the junction between the primary and secondary combustion chambers 140, 150, and air nozzles 134 for supplying combustion air. The exhaust port 154 has a radiation plate 162 for reducing heat which would be lost from the exhaust port 154 by way of radiation.

The fluidized-bed gasification furnace and the melt combustion furnace may be combined with a waste heat boiler and a turbine. Specifically, a combustion gas discharged from the melt combustion furnace may pass through a waste heat boiler, in which water may be turned into steam to drive a steam turbine.

In FIG. 4, a deflecting plate similar to the upper bent portion of the partition wall 58 shown in FIG. 3 may be disposed above the fluidizing gas chamber 56 for promoting movement of the fluidized medium from the fluidized bed to the moving bed. The deflecting plate may be inclined so as to be substantially parallel to the air diffusers 62 in FIG. 4.

In FIG. 4, the air diffusers 62 may be disposed horizontally as shown in FIG. 3.

In a region inward of the inclined wall 58 in the furnace shown in FIG. 1, the fluidizing gas may have an intermediate fluidizing gas supplied into the furnace from an intermediate furnace bottom between the central furnace bottom (above the fluidizing gas chamber 55) and the peripheral furnace bottom (above the fluidizing gas chamber 56). The mass flow of the intermediate fluidizing gas may be intermediate between the mass flow of the central fluidizing gas and the mass flow of the peripheral fluidizing gas. The amount of oxygen contained in the intermediate fluidizing gas may be intermediate between the amount of oxygen contained in the central fluidizing gas and the amount of oxygen contained in the peripheral fluidizing gas.

In the embodiments shown in FIGS. 3 and 4, in a region inward of the inclined wall 58 in the furnace, the fluidizing gas may have a third fluidizing gas supplied into the furnace from a third furnace bottom between the first region at the furnace bottom and the second region at the furnace bottom. The mass flow of the third fluidizing gas may be intermediate between the mass flow of the first fluidizing gas and the mass flow of the second fluidizing gas.

More preferably, the amount of oxygen contained in the third fluidizing gas may be intermediate between the amount of oxygen contained in the first fluidizing gas and the amount of oxygen contained in the second fluidizing gas.

Figure 10:
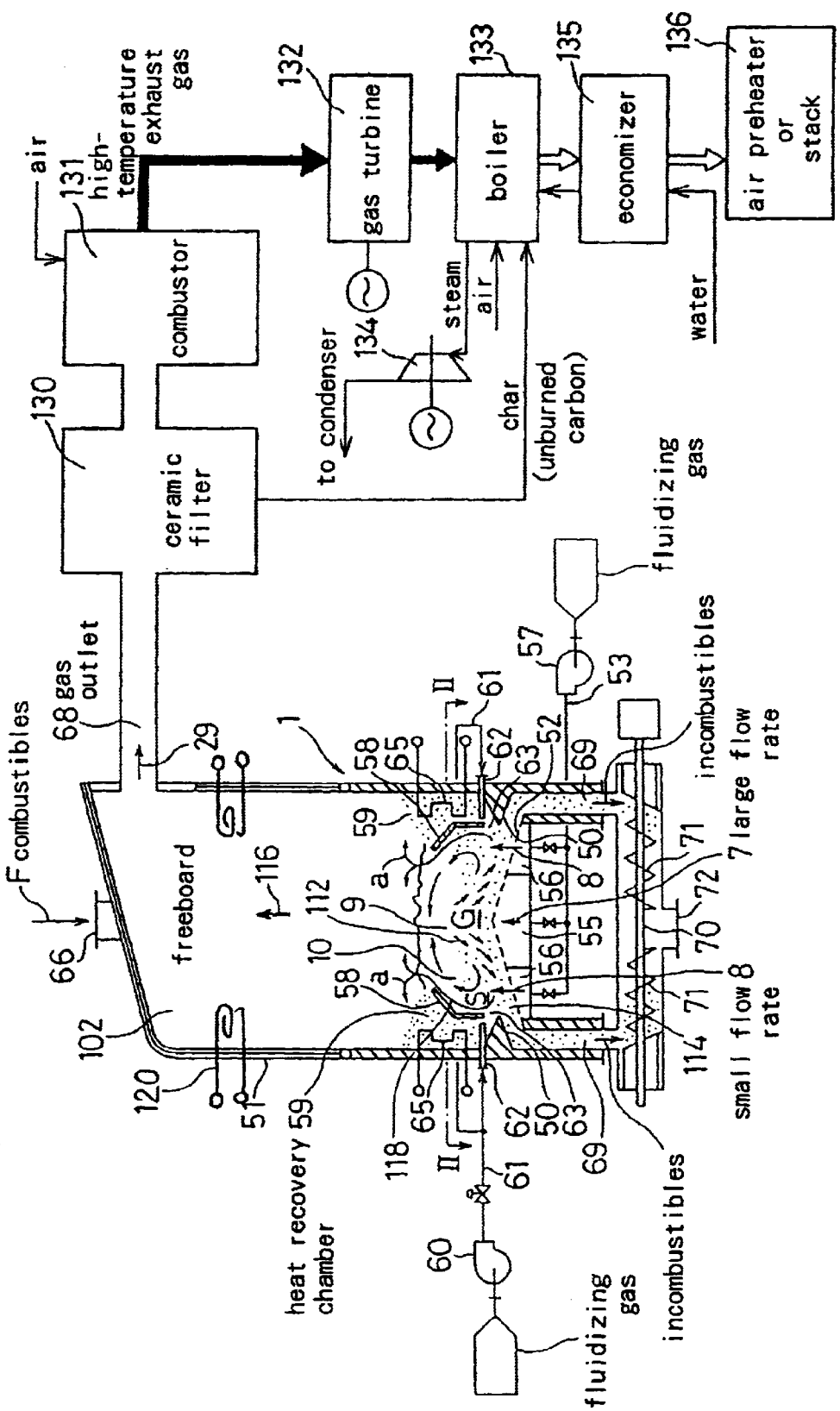
FIG. 10 is a cross-sectional view of a combined-cycle power generation system to which a gasifying method of the present invention is applied.

FIG. 10 shows a combined-cycle power generation system to which a gasifying method according to the present invention is applied. If a coal ratio in gasification material for the fluidized-bed furnace is increased, then since ash is reduced, a ceramic filter may be used instead of a melt combustion furnace for removing unburned matter, and ash. By combusting a combustible gas produced in the fluidized-bed furnace in a combustor, it is possible to make the exhaust gas temperature higher than the upper limit of fluidized-bed temperature for preventing agglomerations from being formed in the fluidized bed. As a result, the inlet gas temperature of a gas turbine may be increased to make the combined-cycle power generation system highly efficient.

As shown in FIG. 10, the bed in an internal circulating fluidized-bed furnace 1 is divided by a partition wall 58 into a central combustion region for partially combusting combustibles, and a peripheral heat recovery region 59 disposed around the central combustion region and having heat transfer tubes 65 disposed in the bed. In the combustion region, there is developed a swirling flow composed of a central moving bed 9 and a peripheral fluidized bed 10.

The oxygen concentration in a fluidizing gas 7 blown from a fluidizing gas chamber 55 is made as low as possible, and the heat required for thermally decomposing combustibles F charged into the central moving bed 9 in the combustion region is obtained by the combustion heat with oxygen contained in a fluidizing gas 8 blown from a fluidizing gas chamber 56. In this manner, a gas, obtained by gasification, which can easily react with oxygen is prevented from reacting with oxygen, resulting in a high gasification efficiency. The internal circulating fluidized-bed furnace 1 is housed in a pressure vessel for a high gasification efficiency.

A gas obtained by gasification and containing a large quantity of unburned matter is delivered through a gas outlet 68 to a ceramic filter 130. The inlet gas of the ceramic filter 130 is normally cooled to a temperature of 480° C. or lower. However, the temperature of the gas can be in the range of 800° C. to 900° C. depending on the heat-resisting property of the ceramic filter 130 and the nature of the gas. The gas may be cooled by heat transfer tubes 120 disposed in a freeboard 102 of the gasifying furnace. It is also possible to lower the gas temperature by fluidizing the heat recovery chamber 59 in the gasifying furnace to lower the bed temperature.

Unburned matter trapped by the ceramic filter 130 is sent together with combustion air to a boiler 133 where the unburned matter is combusted. A gas that has passed through the ceramic filter 130 is delivered through a combustor 131 to a gas turbine 132. After power is recovered by the gas turbine 132, the gas is delivered to the boiler 133. The boiler 133 is supplied with the exhaust gas from the gas turbine 132 and the unburned matter from the ceramic filter 130, and they are burned. The heat generated in the boiler 133 is recovered as steam, which is supplied to a steam turbine 134 that recovers power. The heat of a combustion gas discharged from the boiler 133 is recovered by an economizer 135 and an air preheater 136, and then the combustion gas is discharged to the atmosphere.

With the conventional fluidized-bed furnaces which are free of heat transfer tubes in the bed, the amount of fuel and the amount of oxygen contained in the fluidizing gas are fixed, the bed temperature is settled to a certain value.

According to this embodiment where the bed temperature can be adjusted, the air ratio and the bed temperature in the fluidized-bed furnace can be controlled fully independently of each other, so that operating conditions of the gasifying furnace can be adjusted to optimize operating conditions of the combustor 131 upstream of the gas turbine 132, and the boiler 133.

To put it concretely, when the output of the gas turbine is low, the air ratio is reduced and the bed temperature is increased to thereby increase gasification efficiency. When the temperature of the steam is low, the bed temperature in the fluidized-bed furnace goes down to lower gasification efficiency to thereby increase unburned char.

As described above, the present invention offers the following advantages:

(1) With the fluidized-bed furnace having the heat recovery region, the temperature of the fluidized bed or the temperature of the freeboard can be controlled at a desired temperature irrespective of fluctuations in the composition of the gasification material. Since the reaction in the melt combustion furnace is sensitive to inlet gas conditions of the melt combustion furnace and the inlet gas conditions of the melt combustion furnace can be stabilized, a maximum effect can be obtained in a combination of the fluidized-bed furnace and the melt combustion furnace.

(2) By controlling the heat recovery rate by the heat recovery region, it is possible to adjust the gas produced in the fluidized-bed furnace to an optimum temperature for the equipment following the fluidized-bed furnace.

(3) Because heat is diffused by a circulating flow of the fluidized medium in the fluidized-bed furnace, the furnace may be subjected to a high load and may be small in size.

(4) The fluidized-bed furnace can maintain combustion with a small amount of air. By means of a low air ratio and a low temperature in the fluidized-bed furnace, heat generation is minimized due to slow combustion, and it is possible to obtain a uniform gas quality containing a large amount of combustibles, and to utilize most of the combustibles including gases, tar, and char in the subsequent combustion furnace. Because of the low temperature in the fluidized-bed furnace, it is not necessary to strictly select castable materials for its heat resistance, and the cost of the furnace may be lowered.

(5) Large-size incombustibles can easily be discharged by a circulating flow of the fluidized medium in the fluidized-bed furnace. Iron and aluminum in the incombustibles can be used in unoxidized condition.

(6) With the fluidized-bed furnace combined with the melt combustion furnace, there is provided a method and apparatus for decomposing dioxin through high-temperature gasification, making refuse treatment harmless, and achieving a high energy recovering ratio.

The present invention is preferably used to gasify combustibles such as municipal wastes, plastic wastes or coal and to utilize a generated gas as a material for chemical industry or a fuel, or to obtain a useful gas from combustibles such as wastes.

What is claimed is:

1. A method of treating combustibles, said method comprising:

circulating a fluidized medium between a combustion region and a heat recovery region within a bed of a fluidized-bed furnace such that said fluidized medium is heated in said combustion region;

gasifying combustibles in said combustion region of said fluidized-bed furnace, thus generating combustible gas and non-combusted particles;

recovering heat from said fluidized medium in said heat recovery region of said fluidized-bed furnace after said fluidized medium has been heated in said combustion region, so as to thereby control a temperature of said bed; and delivering said combustible gas and non-combusted particles to a melt combustion furnace and therein combusting said combustible gas and melting non-combustible ash of said non-combusted particles.

2. A method as claimed in claim 1, wherein said combustion region and said heat recovery region are separated by a partition wall and are connected above and below said partition wall, said combustion region includes first and second areas adjacent to each other, and further comprising:

supplying a first fluidizing gas as an upward flow into said first area, supplying a second fluidizing gas as an upward flow into said second area, and supplying heat recovery region fluidizing gas to said heat recovery region;

controlling a mass flow of said first fluidizing gas to be smaller than a mass flow of said second fluidizing gas to create in said first area a moving bed where said fluidized medium descends and is dispersed and to create in said second area a fluidized bed where said fluidized medium is fluidized, whereby said combustibles are gasified into a combustible gas in said combustion region while circulating therein with said fluidized medium; and flowing said fluidized medium from said combustion region over said partition wall into said heat recovery region, and returning said fluidized medium in said heat recovery region to said combustion region; and said controlling comprises adjusting said supplying said heat recovery region fluidizing gas to said heat recovery region.

3. A method as claimed in claim 2, further comprising regulating a temperature in said fluidized-bed furnace.

4. A method as claimed in claim 3, wherein said regulating comprises, as a primary temperature control, controlling a temperature in said combustion region by adjusting said supplying said first fluidizing gas to said first area and said supplying said second fluidizing gas to said second area, and, as an auxiliary temperature control, controlling a temperature in said heat recovery region by said adjusting said supplying said heat recovery region fluidizing gas to said heat recovery region.

5. A method as claimed in claim 3, wherein said regulating comprises, as an auxiliary temperature control, controlling a temperature in said combustion region by adjusting said supplying said first fluidizing gas to said first area and said supplying said second fluidizing gas to said second area, and, as a primary temperature control, controlling a temperature in said heat recovery region by said adjusting said supplying said heat recovery region fluidizing gas to said heat recovery region.

6. A method as claimed in claim 1, wherein said fluidized-bed furnace has a substantially circular cross-sectional shape, said combustion region comprises a circular central region, said heat recovery region comprises an outer peripheral region, said combustion region and said heat recovery region are separated by a partition wall and are connected above and below said partition wall, said combustion region includes central and peripheral areas adjacent to each other, and further comprising:

supplying a central fluidizing gas as an upward flow into said central area, supplying a peripheral fluidizing gas as an upward flow into said peripheral area, and supplying heat recovery region fluidizing gas to said heat recovery region;

controlling a mass flow of one of said central fluidizing gas and said peripheral fluidizing gas to be smaller than a mass flow of the other of said peripheral fluidizing gas and said central fluidizing gas, to create in one of said central area and said peripheral area a moving bed where said fluidized medium descends and is dispersed and to create in the other of said peripheral area and said central area a fluidized bed where said fluidized medium is fluidized, whereby said combustibles are gasified into a combustible gas in said combustion region while circulating therein with said fluidized medium; and flowing said fluidized medium from said combustion region over said partition wall into said heat recovery region, and returning said fluidized medium in said heat recovery region to said combustion region; and said controlling comprises adjusting said supplying said heat recovery region fluidizing gas to said heat recovery region.

7. A method as claimed in claim 6, further comprising regulating a temperature in said fluidized-bed furnace.

8. A method as claimed in claim 7, wherein said regulating comprises, as a primary temperature control, controlling a temperature in said combustion region by adjusting said supplying said central fluidizing gas to said central area and said supplying said peripheral fluidizing gas to said peripheral area, and, as an auxiliary temperature control, controlling a temperature in said heat recovery region by said adjusting said supplying said heat recovery region fluidizing gas to said heat recovery region.

9. A method as claimed in claim 7, wherein said regulating comprises, as an auxiliary temperature control, controlling a temperature in said combustion region by adjusting said supplying said central fluidizing gas to said central area and said supplying said peripheral fluidizing gas to said peripheral area, and, as a primary temperature control, controlling a temperature in said heat recovery region by said adjusting said supplying said heat recovery region fluidizing gas to said heat recovery region.

10. An apparatus for treating combustibles, said apparatus comprising:

a fluidized-bed furnace including a bed having a combustion region for gasifying combustibles so as to generate combustible gas and non-combusted particles, and having a heat recovery region, said fluidized-bed furnace further including a fluidized medium operable to circulate between said combustion region, whereat said fluidized medium is heated, and said heat recovery region;

a heat recovery surface in said heat recovery region for recovering heat from said fluidized medium after said fluidized medium has been heated in said in said combustion region, so as to thereby control a temperature of said bed; and a melt combustion furnace for receiving the combustible gas and the non-combusted particles and for combusting the combustible gas and melting non-combustible ash of the non-combusted particles.

11. An apparatus as claimed in claim 10, wherein said combustion region and said heat recovery region are separated by a partition wall, said combustion region includes first and second areas adjacent to each other, and further comprising:

an air diffusion device to supply a first fluidizing gas as an upward flow into said first area, to supply a second fluidizing gas as an upward flow into said second area, and to supply heat recovery region fluidizing gas to said heat recovery region, said air diffusion device being structured such that a mass flow of said first fluidizing gas is smaller than a mass flow of said second fluidizing gas to create in said first area a moving bed where said fluidized medium descends and is dispersed and to create in said second area a fluidized bed where said fluidized medium is fluidized, whereby said combustibles are gasified into a combustible gas in said combustion region while circulating therein with said fluidized medium; and wherein said combustion region and said heat recovery region are connected above and below said partition wall, to allow said fluidized medium from said combustion region to flow over said partition wall into said heat recovery region;

said heat recovery surface comprises a member in said heat recovery region for a medium to pass therethrough; and said air diffusion device includes a heat recovery region air diffuser at a bottom of said heat recovery region, said heat recovery air diffuser being structured to adjust the supply of said heat recovery region fluidizing gas to said heat recovery region to cause said fluidized medium in said heat recovery region to descend therein as a moving bed and to circulate therefrom below said partition wall back to said combustion region.

12. An apparatus as claimed in claim 10, wherein said fluidized-bed furnace has a substantially circular cross-sectional shape, said combustion region comprises a circular central region, said heat recovery region comprises a peripheral region, said combustion region and said heat recovery region are separated by a partition wall, said combustion region includes central and peripheral areas adjacent to each other, and further comprising:

an air diffusion device to supply a central fluidizing gas as an upward flow into said central area, to supply a peripheral fluidizing gas as an upward flow into said peripheral area, and to supply heat recovery region fluidizing gas to said heat recovery region, said air diffusion device being structured such that a mass flow of one of said central fluidizing gas and said peripheral fluidizing gas is smaller than a mass flow of the other of said peripheral fluidizing gas and said central fluidizing gas to create in one of said central area and said peripheral area a moving bed where said fluidized medium descends and is dispersed and to create in the other of said peripheral area and said central area a fluidized bed where said fluidized medium is fluidized, whereby said combustibles are gasified into a combustible gas in said combustion region while circulating therein with said fluidized medium; and wherein said combustion region and said heat recovery region are connected above and below said partition wall, to allow said fluidized medium from said combustion region to flow over said partition wall into said heat recovery region;

said heat recovery surface comprises a member in said heat recovery region for a medium to pass therethrough; and said air diffusion device includes a heat recovery region air diffuser at a bottom of said heat recovery region, said heat recovery air diffuser being structured to adjust the supply of said heat recovery region fluidizing gas to said heat recovery region to cause said fluidized medium in said heat recovery region to descend therein as a moving bed and to circulate therefrom below said partition wall back to said combustion region.

13. A method of treating combustibles, said method comprising:

circulating a fluidized medium between a combustion region and a heat recovery region within a bed of a fluidized-bed furnace such that said fluidized medium is heated in said combustion region;

gasifying combustibles in said combustion region, thus generating combustible gas and non-combusted particles;

recovering heat from said fluidized medium after said fluidized medium has been heated in said combustion region; and delivering said combustible gas and non-combusted particles to a melt combustion furnace and therein combusting said combustible gas and melting non-combustible ash of said non-combusted particles.

14. A method as claimed in claim 13, further comprising maintaining said bed of said fluidized-bed furnace at a temperature of 450° C. to 800° C., and wherein said melting of said non-combustible ash of said non-combustible particles is conducted at a temperature of at least 1300° C.

15. An apparatus for treating combustibles, said apparatus comprising:

a fluidized-bed furnace including a bed having a combustion region for gasifying combustibles so as to generate combustible gas and non-combusted particles, and having a heat recovery region, said fluidized-bed furnace further including a fluidized medium operable to circulate between said combustion region and said heat recovery region;

a heat recovery surface in said heat recovery region for recovering heat from said fluidized medium after said fluidized medium has been heated in said combustion region; and a melt combustion furnace for receiving the combustible gas and the non-combusted particles and for combusting the combustible gas and melting non-combustible ash of the non-combusted particles.

16. An apparatus as claimed in claim 15, wherein said heat recovery surface is operable to recover heat from said fluidized medium so as to maintain said bed of said fluidized-bed furnace at a temperature of 450° C. to 800° C., and wherein said melt combustion furnace is operable to melt said non-combustible ash of said non-combustible particles at a temperature of at least 1300° C.

17. An apparatus for treating combustibles, said apparatus comprising:

a fluidized-bed furnace having a gasification region for gasifying combustibles so as to generate combustible gas and non-combusted particles, and having a heat recovery region, said fluidized-bed furnace further including a fluidized medium operable to circulate between said gasification region and said heat recovery region;

a heat recovery surface in said heat recovery region for recovering heat from said fluidized medium; and a melt combustion furnace for receiving the combustible gas and the non-combusted particles and for combusting the combustible gas and melting non-combustible ash of the non-combusted particles.

18. An apparatus as claimed in claim 17, wherein said heat recovery surface is operable to recover heat from said fluidized medium so as to maintain said fluidized-bed furnace at a temperature of 450° C. to 800° C., and wherein said melt combustion furnace is operable to melt said non-combustible ash of said non-combustible particles at a temperature of at least 1300° C.

* * * * *

UNITED STATES PATENT AND TRADEMARK OFFICE
CERTIFICATE OF CORRECTION

PATENT NO. : 6,709,636 B1
DATED : March 23, 2004
INVENTOR(S) : Takahiro Oshita et al.

It is certified that error appears in the above-identified patent and that said Letters Patent is hereby corrected as shown below:

<u>Title page,</u>
Item [54], Title, please replace "METHOD AND APPARATUS FOR GASIFYING FLUIDIZED BED" with the following -- FLUIDIZED-BED GASIFICATION METHOD AND APPARATUS --.

Signed and Sealed this

Sixteenth Day of November, 2004

JON W. DUDAS
*Director of the United States Patent and Trademark Office*